United States Patent [19]

Nisley

[11] Patent Number: 5,749,659
[45] Date of Patent: May 12, 1998

[54] BEARING TAKE-UP APPARATUS UTILIZING CONVENTIONAL FLANGE BEARING

[75] Inventor: Donald L. Nisley, Greenville, S.C.

[73] Assignee: Reliance Electric Industrial Company, Cleveland, Ohio

[21] Appl. No.: 749,299

[22] Filed: Nov. 14, 1996

[51] Int. Cl.[6] ................................................ F16C 23/02
[52] U.S. Cl. ............................................. 384/260; 384/247
[58] Field of Search ................................. 384/247, 252, 384/254, 256, 257, 258, 259, 260

[56] References Cited

U.S. PATENT DOCUMENTS

| | | | |
|---|---|---|---|
| 2,149,723 | 3/1939 | Briggs | 384/256 |
| 2,291,733 | 8/1942 | Lemmon | 384/260 |
| 2,425,943 | 8/1947 | Krause | 384/260 |
| 2,587,851 | 3/1952 | Hyman | 384/260 |
| 2,791,474 | 5/1957 | Richard | 384/260 |
| 4,212,502 | 7/1980 | Ames et al. | 384/42 |
| 4,325,588 | 4/1982 | Elliott, Jr. et al. | 384/247 |
| 4,500,271 | 2/1985 | Smith | 384/259 X |
| 4,676,670 | 6/1987 | Nisley | 384/247 |

OTHER PUBLICATIONS

Sealmaster Catalog, Emerson Power Transmission Corp., dated 1988, pp. 52–53.
Torrington Catalog, Torrington Corporation, dated 1988, pp. 208–209.
Dodge Engineering Catalog, vol. 1.1, Reliance Electric Industrial Co., dated 1989, pp. 82–14 thru 82–15 and 86–8 thru 86–11.

Primary Examiner—Thomas R. Hannon
Attorney, Agent, or Firm—Craig N. Killen; John M. Miller; John J. Horn

[57] ABSTRACT

A bearing take-up apparatus is adapted to utilize a bearing assembly having a conventional flange bearing housing. The apparatus includes a bearing carrier mounted for slidable movement between a pair of parallel guide rails. The bearing carrier may be formed of a unitary piece of sheet metal according to known metal forming techniques. The bearing assembly is mounted to the bearing carrier to support a rotatable shaft. The bearing carrier is moved to a desired position along the guide rails utilizing an elongated transmission screw or the like. The arrangement facilitates replacement of the bearing assembly in the field.

17 Claims, 3 Drawing Sheets

BEARING TAKE-UP APPARATUS UTILIZING CONVENTIONAL FLANGE BEARING

BACKGROUND OF THE INVENTION

The present invention relates to take-up frames used to adjust the position of a bearing assembly supporting a rotatable shaft. More particularly, the invention relates to a take-up apparatus that facilitates the use of a bearing assembly having a conventional flange housing.

It is necessary in many applications to occasionally adjust the position of an element, such as a pulley or a drive sprocket, attached to a rotatable shaft. For example, the endless belt of a conveyor mechanism will often have a tendency to stretch during use. As a result, slippage may occur between the conveyor belt and one or more of the pulleys about which it extends. This slippage is particularly undesirable in the case of a driven pulley, since it may cause a slowdown in conveyor operation.

To compensate for this effect, the position of the rotatable shaft may be adjusted utilizing a take-up frame. These devices typically include a specially configured bearing, known as a "bearing block," supporting the shaft. The bearing block is itself mounted between a pair of longitudinal rails extending in a direction transverse to the axial direction of the shaft. The bearing block may be selectively moved along the rails to place the shaft in a desired position. Typically, the slidable movement of the bearing block is effected by an elongated transmission screw.

While bearing blocks work well for their intended purpose, they do have certain drawbacks. In particular, the configured housing of the bearing block tends to be more expensive than conventional flange bearing designs. In addition, it is often difficult to remove a bearing block from a take-up apparatus after it has been installed for use. This difficulty may increase the "downtime" that occurs if replacement of the bearing block becomes necessary in the field.

SUMMARY OF THE INVENTION

The present invention recognizes and addresses the foregoing disadvantages, and others, of prior art constructions and methods. Accordingly, it is an object of the present invention to provide an improved bearing take-up apparatus.

It is a more particular object of the present invention to provide a bearing take-up apparatus that facilitates use of a conventional flange bearing.

It is a further object of the present invention to provide a bearing take-up apparatus that facilitates replacement of the bearing assembly in the field.

It is also an object of the present invention to provide a bearing carrier for permitting adaptable use of a predetermined bearing assembly in a bearing take-up apparatus.

It is a further object of the present invention to provide a method of removing a bearing assembly maintained within a take-up frame.

Some of these objects are achieved by a bearing take-up apparatus comprising a first elongated member including a first longitudinal guide element. A second elongated member is provided, spaced apart from the first elongated member. The second elongated member includes a second longitudinal guide element situated in parallel with the first longitudinal guide element.

A bearing carrier is mounted between the first elongated member and the second elongated member. The bearing carrier engages the first and second longitudinal guide elements to move axially therealong.

The take-up apparatus also includes a bearing assembly defining a shaft bore for receipt of a shaft therein. The bearing assembly includes a bearing housing separably mounted to the bearing carrier. For example, the bearing assembly may be a conventional flange bearing assembly.

A suitable adjustment mechanism, such as an elongated transmission screw, is operatively connected to the bearing carrier. The adjustment mechanism effects axial movement of the bearing carrier and the bearing assembly mounted thereto.

In exemplary embodiments, the bearing carrier comprises a plate element, such as a unitary, formed sheet metal element. The plate element includes a generally flat mounting portion to which the bearing assembly is mounted. If the first and second longitudinal guide elements are configured as respective longitudinal rails, the plate element preferably defines a respective set of integral projections located at opposite lateral sides thereof. An integral yoke may also be provided on the bearing carrier for facilitating connection of the adjustment mechanism.

Other objects of the invention are achieved by a bearing carrier for permitting adaptable use of a predetermined flange bearing assembly in a bearing take-up frame having first and second longitudinal rails. The carrier comprises a generally flat mounting portion defining a shaft hole and at least one mounting hole. The at least one mounting hole is positioned such that a shaft bore of the bearing assembly will register with the shaft hole when the bearing assembly is mounted thereto.

First and second channel structures extend from the mounting portion on opposite locations thereof. Each of the channel structures defines a channel of predetermined width for receipt about a respective of the first and second longitudinal rails of the take-up frame.

In exemplary embodiments, the first and second channel structures may each comprise a respective set of integral projections extending from the mounting portion. Each set of integral projections may include at least one first projection extending generally in a plane of the mounting portion. At least one L-shaped second projection may also be provided, extending out from the mounting portion. Preferably, two such second projections are provided, located on opposite sides of the first projection. The bearing carrier may define an integral yoke extending from the mounting portion in a direction generally perpendicular thereto.

Other objects of the invention are achieved by a method of removing a bearing assembly having an annular element connected to a shaft for rotation therewith when the bearing assembly is maintained within a take-up frame having opposed longitudinal guide elements. One step of the method involves providing a bearing carrier to which the bearing assembly is separably attached during use. The bearing carrier engages the longitudinal guide elements of the take-up frame for axial movement therealong.

Another step of the method involves disconnecting the annular element of the bearing assembly from the shaft. The bearing assembly is disattached from the bearing carrier. Next, the bearing assembly is moved along the shaft until it clears the shaft end. After the initial bearing assembly is removed, it may be replaced with a similar bearing assembly.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
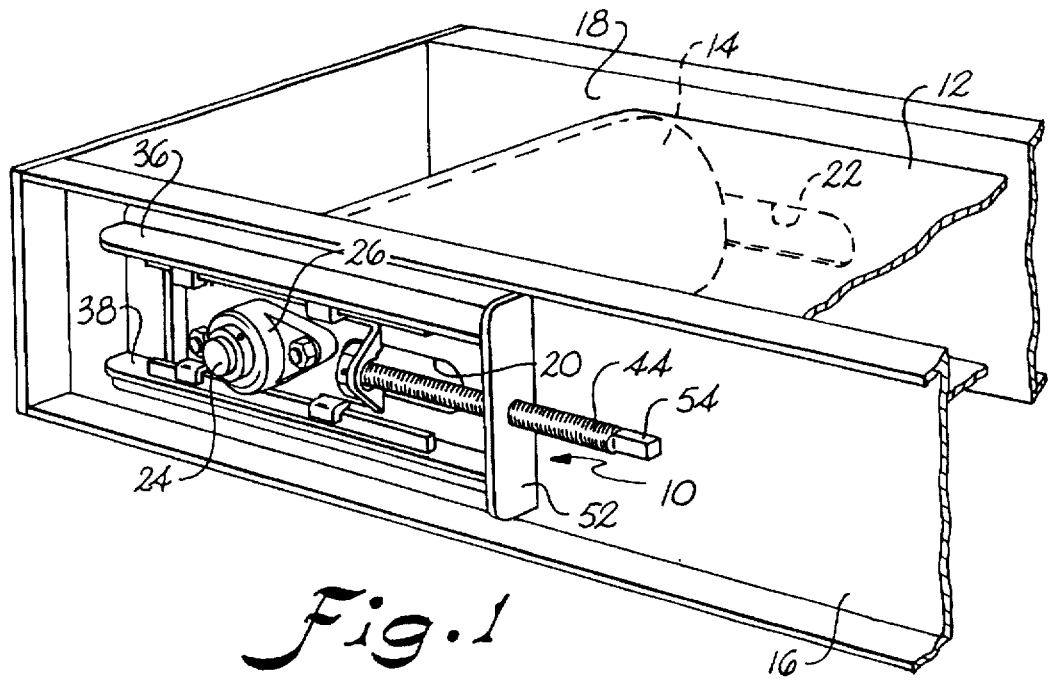
FIG. 1 is a perspective view of an improved take-up apparatus constructed in accordance with the present invention being utilized in connection with a conveyor mechanism.

Repeat use of reference characters in the present specification and drawings is intended to represent same or analogous features or elements of the invention.

DETAILED DESCRIPTION OF THE PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

FIG. 1 illustrates a conveyor mechanism including a take-up apparatus 10 constructed in accordance with the present invention. The conveyor mechanism includes an endless conveyor belt 12 extending about a pulley 14. As shown, pulley 14 is mounted between a pair of sidewalls 16 and 18. Sidewalls 16 and 18 include respective longitudinal slots 20 and 22 through which opposite ends of pulley shaft 24 extend.

Figure 2:
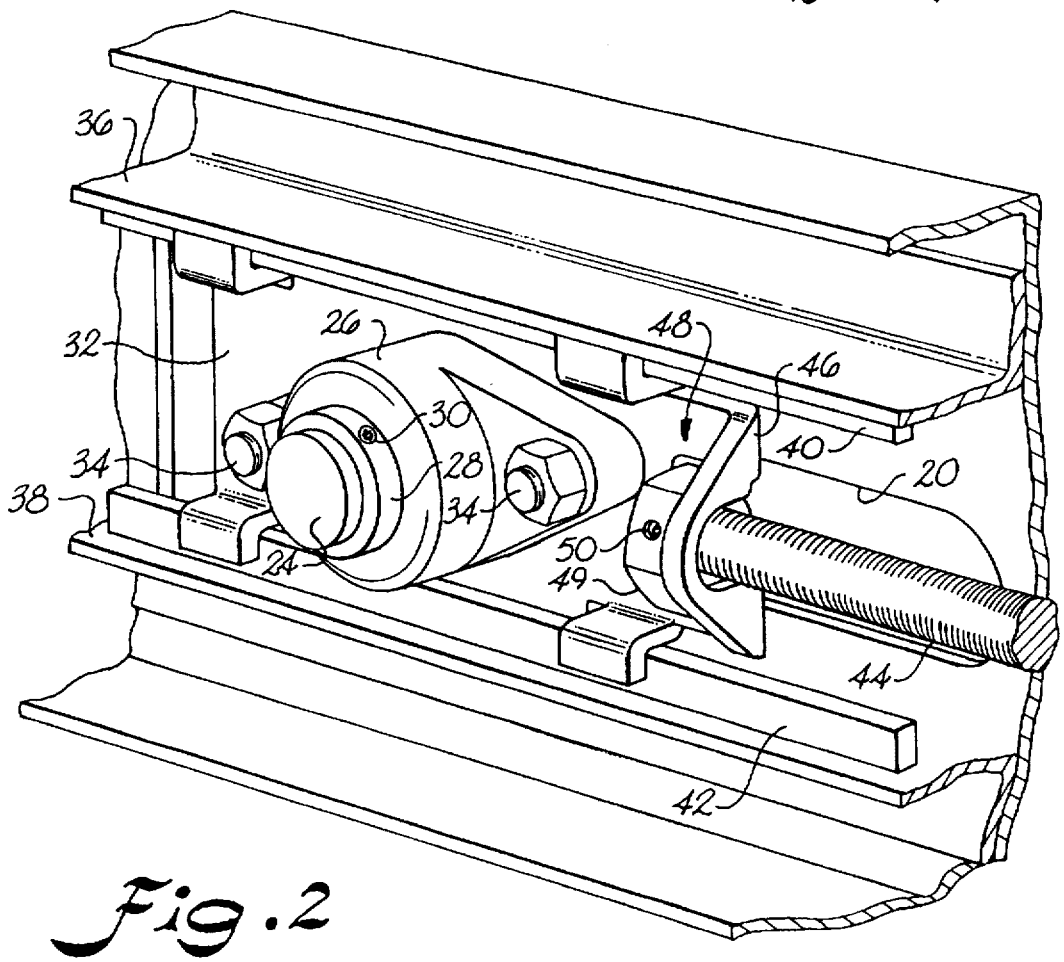
FIG. 2 is an enlarged fragmentary view of the take-up apparatus shown in FIG. 1.
Figure 3:
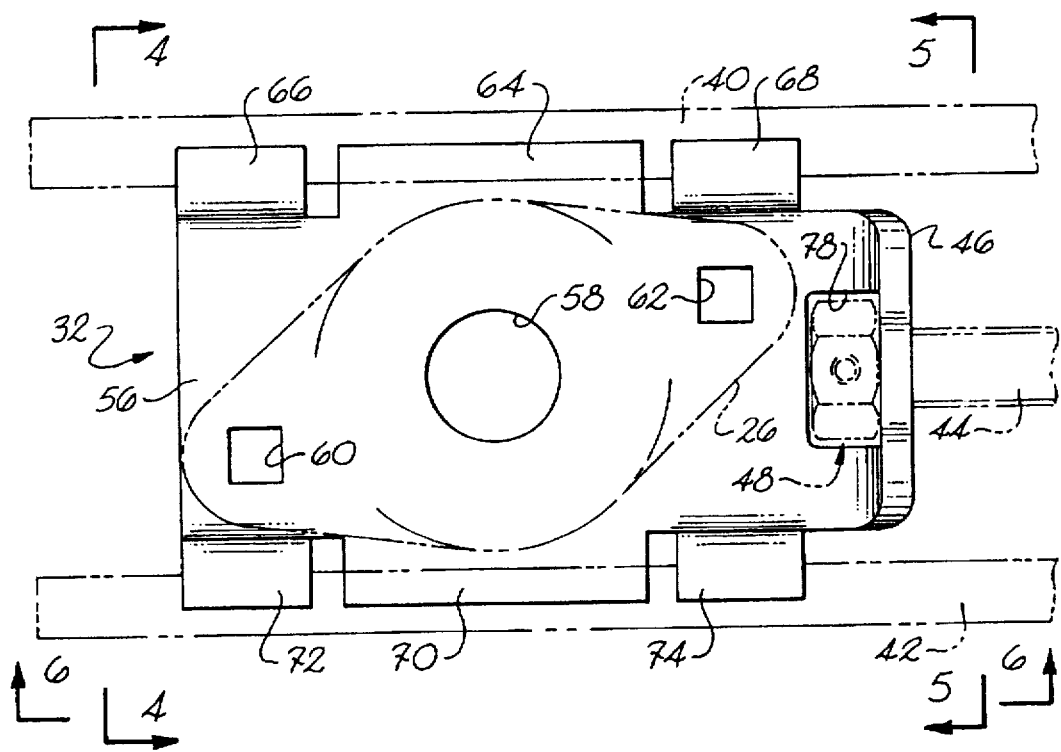
FIG. 3 is a side elevation of a bearing carrier constructed in accordance with the present invention such as may be used in the apparatus of FIG. 1.
Figure 4:
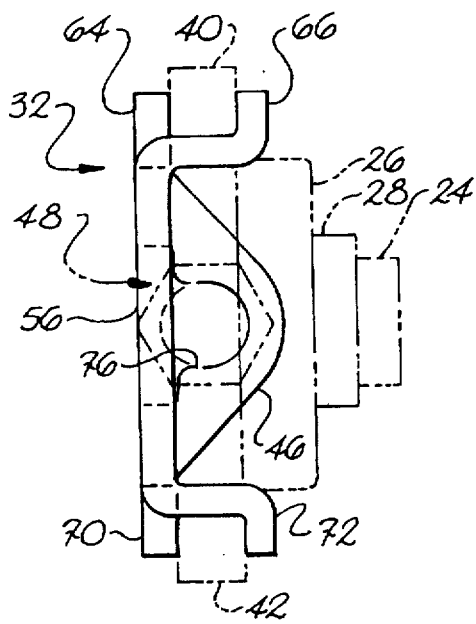
FIG. 4 is an end view of the bearing carrier of FIG. 3 as taken along line 4—4.
Figure 5:
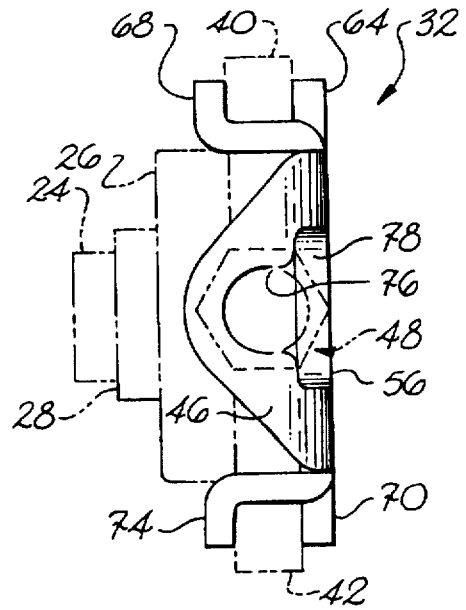
FIG. 5 is an opposite end view of the bearing carrier of FIG. 3 as taken along line 5—5.
Figure 6:
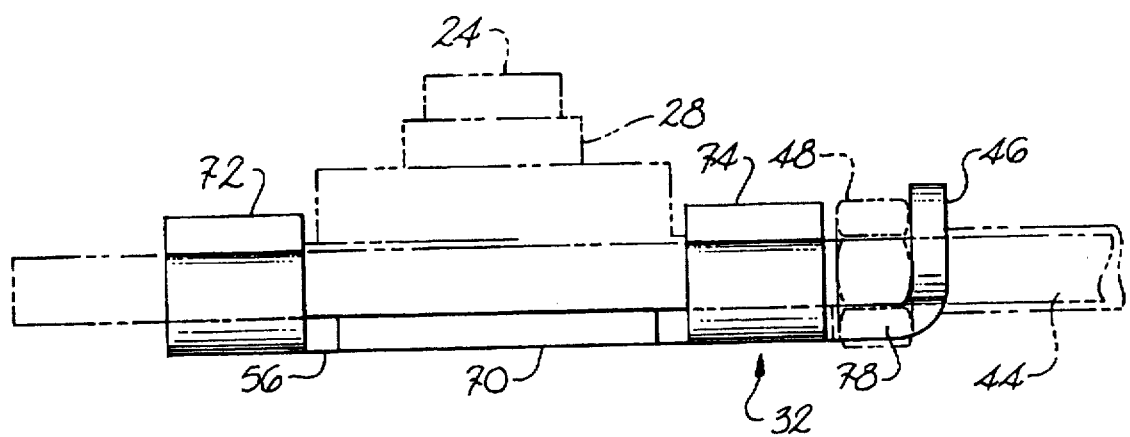
FIG. 6 is a bottom view of the bearing carrier of FIG. 3 as taken along line 6—6.

Referring now also to FIG. 2, apparatus 10 includes a bearing assembly 26 for rotatably supporting shaft 24. Bearing assembly 26 includes a rotatable ring 28 defining a shaft bore through which shaft 24 extends. Rotatable ring 28 is secured to shaft 24 for rotation therewith, such as by one or more setscrews 30 threaded therethrough.

Typically, the bearing arrangement within bearing assembly 26 will be constructed having an outer ring member radially spaced from ring 28. The outer ring member will define an outer race on its inside surface, with ring 28 defining an opposed inner race on its outside surface. A plurality of bearing elements, such as ball bearings or tapered roller bearings, may be disposed in the space between the inner and outer races. As can be seen, bearing assembly 26 is constructed as a conventional two-hole flange bearing mounted to a bearing carrier 32, such as by mounting bolts 34. While a two-hole flange bearing is illustrated, it should be appreciated that various bearing housing configurations can be utilized in a take-up apparatus of the present invention.

Bearing carrier 32 is located between upper and lower elongated members 36 and 38. Members 36 and 38 include longitudinal guide elements along which bearing carrier 32 can be selectively moved. In this case, the longitudinal guide elements are configured as longitudinal rails 40 and 42. As will be explained more fully below, carrier 32 includes upper and lower channel structures defining respective channels of predetermined width. Rails 40 and 42 are respectively received in these channels to slidably maintain bearing carrier 32.

Apparatus 10 further includes an elongated transmission screw 44 connected to bearing carrier 32. In particular, bearing carrier 32 includes an integral yoke 46 to which screw 44 is connected. Screw 44 is retained behind yoke 46 by a retaining arrangement 48 affixed to an end portion thereof. In exemplary embodiments, retaining arrangement 48 includes a nut 49 threaded to an end portion of screw 44. Nut 49 is maintained in position by a dowel or rollpin 50 extending into a transverse hole defined in screw 44. While a preferred retaining arrangement is illustrated, it should be understood that various other suitable retaining arrangements may also be utilized.

As shown in FIG. 1, transmission screw 44 also extends through a hole defined in vertical member 52. Vertical member 52 is itself fixed between elongated members 36 and 38, as shown. The hole through which screw 44 extends is threaded so that rotation of screw 44 will cause axial movement of bearing carrier 32. As such, the position of pulley shaft 24 may be adjusted as desired to account for variations in the tautness of conveyor belt 12. Screw 44 may include a region 54 defining flats to facilitate the use of a wrench when the bearing position is adjusted. Alternatively, flats may be provided by a nut and pin arrangement similar to retaining arrangement 48.

The construction of bearing carrier 32 may be most easily understood with reference to FIGS. 3-6. In presently preferred embodiments, bearing carrier 32 is constructed as a unitary, formed element. For example, bearing carrier 32 may be configured from sheet metal according to known metal forming techniques.

Bearing carrier 32 comprises a generally flat and rectangular mounting portion 56 defining a shaft hole 58 for receipt of shaft 24 therethrough. In the illustrated embodiment, mounting portion 56 further includes a pair of mounting holes 60 and 62 for receipt of mounting bolts 34. Mounting holes 60 and 62 are located so that the shaft bore of bearing assembly 26 will register with shaft hole 58. As shown, mounting holes 60 and 62 may be square to permit the use of carriage bolts.

In the illustrated embodiment, the channels for receipt of longitudinal rails 40 and 42 are defined by respective sets of projections extending from the top and bottom of mounting portion 56. The top set of projections may include a first projection 64 extending in the plane of mounting portion 56. A pair of L-shaped second projections 66 and 68 are located on each lateral side of first projection 64. Similarly, the bottom set of projections includes a planar first projection 70 and a pair of L-shaped second projections 72 and 74.

The configuration of yoke 46 will now be explained. As can be seen, yoke 46 defines a hole 76 through which transmission screw 44 extends. Hole 76 is configured to allow free rotation of screw 44 as bearing carrier 32 is axially moved. Mounting portion 56 defines a slot 78 behind yoke 46 for partial receipt of retaining arrangement 48 therein. As a result, retaining arrangement 48 will be maintained in position relative to bearing carrier 32 as it is axially moved.

Based on the above, it will be appreciated that bearing assembly 26 can be replaced in the field without removal of bearing carrier 32. Referring again to FIGS. 1 and 2, this is accomplished in the illustrated embodiment by loosening set screw 30 and disconnecting ring 28 from shaft 24. Bolts 34 are then removed to disattach bearing assembly 26 from carrier 32. Bearing assembly 26 is then slid along shaft 24 until it has been completely removed. After bearing assembly 26 has been removed, it can be replaced with a new bearing assembly of similar configuration.

It can thus be seen that the present invention provides an effective take-up apparatus utilizing a conventional flange bearing. As such, any additional cost involved in providing a configured bearing block can be eliminated. In addition, the invention facilitates replacement of the bearing assembly when necessary.

While preferred embodiments of the invention have been shown and described, modifications and variations may be made thereto by those of ordinary skill in the art without departing from the spirit and scope of the present invention, which is more particularly set forth in the appended claims. For example, while a setscrew arrangement has been shown for securing the bearing assembly to the rotatable shaft, various other securing arrangements, such as clamping collar or eccentric collar arrangements, may also be utilized for this purpose. In addition, it should be understood that aspects of the various embodiments may be interchanged both in whole or in part. Furthermore, those of ordinary skill in the art will appreciate that the foregoing description is by way of example only and is not intended to limit the invention so further described in such appended claims.

What is claimed is:

1. A bearing take-up apparatus comprising:

a first elongated member including a first longitudinal rail;

a second elongated member spaced apart from said first elongated member, said second elongated member including a second longitudinal rail situated in parallel with said first longitudinal rail;

a bearing carrier mounted between said first elongated member and said second elongated member, said bearing carrier including guide structures engaging said first and second longitudinal rails to move axially thereabout;

a bearing assembly defining a shaft bore for receipt of a shaft therein, said bearing assembly including a bearing housing removably mounted to said bearing carrier such that said guide structures of said bearing carrier are operatively maintained in position on said first and second longitudinal rails independently of said bearing housing and an adjustment mechanism operatively connected to said bearing carrier to effect axial movement of said bearing carrier and said bearing assembly mounted thereto.

2. A bearing take-up apparatus as set forth in claim 1, wherein said bearing carrier comprises a plate element having a generally flat mounting portion to which said bearing assembly is mounted.

3. A bearing take-up apparatus as set forth in claim 2, wherein said plate element defines a respective set of integral projections at opposite lateral sides thereof, for engaging said first longitudinal rail and said second longitudinal rail, respectively.

4. A bearing take-up apparatus as set forth in claim 3, wherein said bearing carrier defines an integral yoke configured such that said adjustment mechanism may be connected thereto.

5. A bearing take-up apparatus as set forth in claim 4, wherein said bearing carrier comprises a unitary, formed sheet metal element.

6. A bearing take-up apparatus as set forth in claim 1, wherein said adjustment mechanism comprises an elongated transmission screw.

7. A bearing take-up apparatus as set forth in claim 1, wherein said bearing assembly comprises a flange bearing assembly.

8. A bearing take-up apparatus as set forth in claim 7, wherein said bearing assembly comprises a two-hole flange bearing assembly.

9. A bearing carrier for permitting adaptable use of a predetermined flange bearing assembly in a bearing takeup frame apparatus having first and second longitudinal rails, said carrier comprising:

a generally flat mounting portion defining a shaft hole and further defining at least one mounting hole, said at least one mounting hole being positioned such that a shaft bore of said bearing assembly will register with said shaft hole when said bearing assembly is mounted thereto; and first and second channel structures extending from said mounting portion at opposite locations thereof for engaging said first and second longitudinal rails of said take-up apparatus, each of said channel structures defining a channel of predetermined width greater than a width of a respective of said first and second longitudinal rails.

10. A bearing carrier as set forth in claim 9, wherein said first and second channel structures each comprise a respective set of integral projections extending from said mounting portion.

11. A bearing carrier as set forth in claim 9, wherein said mounting portion defines at least two mounting holes.

12. A bearing carrier for permitting adaptable use of a predetermined flange bearing assembly in a bearing take-up frame apparatus having first and second longitudinal rails, said carrier comprising:

a generally flat mounting portion defining a shaft hole and further defining at least one mounting hole, said at least one mounting hole being positioned such that a shaft bore of said bearing assembly will register with said shaft hole when said bearing assembly is mounted thereto; and first and second channel structures extending from said mounting portion at opposite locations thereof for engaging said first and second longitudinal rails of said take-up apparatus, each of said channel structures comprising a respective set of integral projections extending from said mounting portion and defining a channel of predetermined width greater than a width of a respective of said first and second longitudinal rails, wherein each set of integral projections includes at least one first projection extending generally in a plane of said mounting portion, and at least one L-shaped second projection extending out from said mounting portion.

13. A bearing carrier as set forth in claim 12, wherein each set of integral projections includes two second projections located on opposite sides of said first projection.

14. A bearing carrier as set forth in claim 12, wherein said bearing carrier defines an integral yoke extending from said mounting portion in a direction generally perpendicular thereto.

15. A bearing carrier as set forth in claim 14, wherein said bearing carrier comprises a unitary, formed sheet metal element.

16. A bearing take-up apparatus comprising:

a first elongated member including a first longitudinal guide element;

a second elongated member spaced apart from said first elongated member, said second elongated member including a second longitudinal guide element situated in parallel with said first longitudinal guide element;

a bearing carrier mounted between said first elongated member and said second elongated member;

a flange bearing assembly defining a shaft bore for receipt of a shaft therein, said flange bearing assembly including a bearing housing removably mounted to said bearing carrier;

said bearing carrier being configured to engage said first and second longitudinal guide elements for guided axial movement therealong independently of said bearing housing; and an adjustment mechanism operatively connected to said bearing carrier to effect axial movement of said bearing carrier and said bearing assembly mounted thereto.

17. A bearing take-up apparatus as set forth in claim 16, wherein said bearing housing defines at least two mounting holes in a flange portion thereof, said bearing housing being mounted to said bearing carrier utilizing through-bolts extending through said mounting holes.

* * * * *